United States Patent [19]

Hegler et al.

[11] 4,381,276
[45] Apr. 26, 1983

[54] PROCESS AND APPARATUS FOR THE FABRICATION OF A FLAT-SHAPED HOLLOW BODY

[75] Inventors: Wilhelm Hegler, Goethestrasse 2, D-8730 Bad Kissingen, Fed. Rep. of Germany; Ralph-Peter Hegler, Bad Kissingen, Fed. Rep. of Germany

[73] Assignee: Wilhelm Hegler, Bad Kissingen, Fed. Rep. of Germany

[21] Appl. No.: 280,837

[22] Filed: Jul. 6, 1981

[30] Foreign Application Priority Data

Jul. 17, 1980 [DE] Fed. Rep. of Germany ....... 3027045

[51] Int. Cl.³ ............................................. B29C 17/07
[52] U.S. Cl. ............................... 264/508; 156/244.14; 264/566; 264/568; 425/326.1; 425/336; 425/342.1; 425/369; 425/388; 425/396
[58] Field of Search .............. 264/568, 566, 508, 545, 264/209.3; 425/325, 326.1, 342.1, 336, 369, 395–396, 539, 388; 156/244.14, 244.15, 285

[56] References Cited

U.S. PATENT DOCUMENTS

| | | | |
|---|---|---|---|
| 3,035,302 | 5/1962 | Lysobey | 264/566 |
| 3,099,043 | 7/1963 | Held, Jr. | 264/545 |
| 3,235,638 | 2/1966 | Winstead | 264/545 |
| 3,776,679 | 12/1973 | Hegler | 425/539 |
| 3,812,230 | 5/1974 | Takahashi | 264/568 |
| 3,976,414 | 8/1976 | Hegler et al. | 425/395 |
| 3,981,663 | 9/1976 | Lupke | 425/326.1 |
| 4,021,178 | 5/1977 | Braun | 425/326.1 |
| 4,212,618 | 7/1980 | Hegler | 425/326.1 |

FOREIGN PATENT DOCUMENTS

| | | | |
|---|---|---|---|
| 902314 | 6/1972 | Canada | 264/508 |
| 2210445 | 9/1973 | Fed. Rep. of Germany . | |
| 2521374 | 12/1976 | Fed. Rep. of Germany . | |
| 2732635 | 2/1979 | Fed. Rep. of Germany ... | 425/326.1 |

*Primary Examiner*—Jeffery R. Thurlow
*Attorney, Agent, or Firm*—Browdy and Neimark

[57] ABSTRACT

A process for the manufacture of a flat-shaped hollow body through the use of a forming die, wherein mold segment halves move continuously along a forming die and which, upon entering the forming die, are moved in an operating direction facing each other in pairs in a closed mold in tight proximity to each other. The mold is injected with warm thermoplastic hose stock which is shaped under vacuum action in the mold. In order to produce flat-shaped hollow bodies on a continuous basis the hose stock is subjected to vacuum action over at least a portion of its cross section even before mold segment halves are brought together and is pressed together accompanied by the formation of welds and the creation of hollow spaces over a portion of its cross section.

9 Claims, 12 Drawing Figures

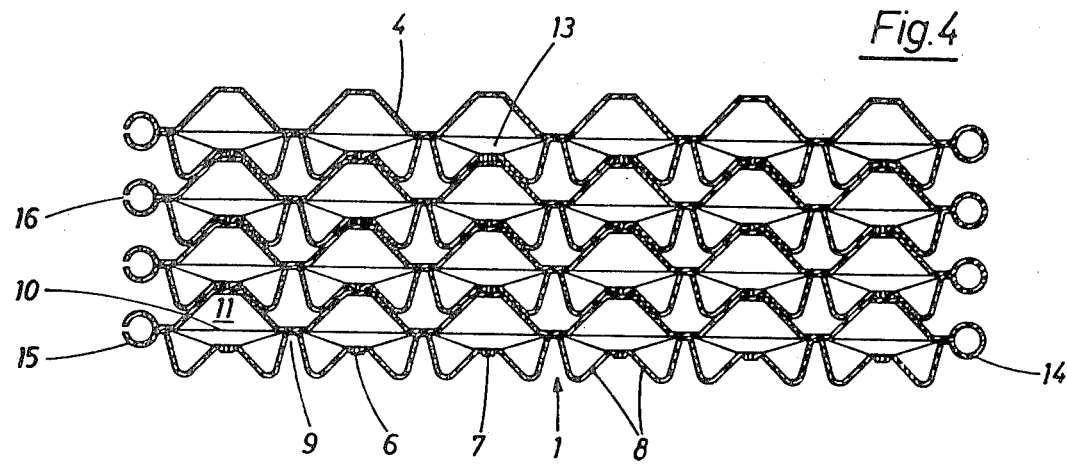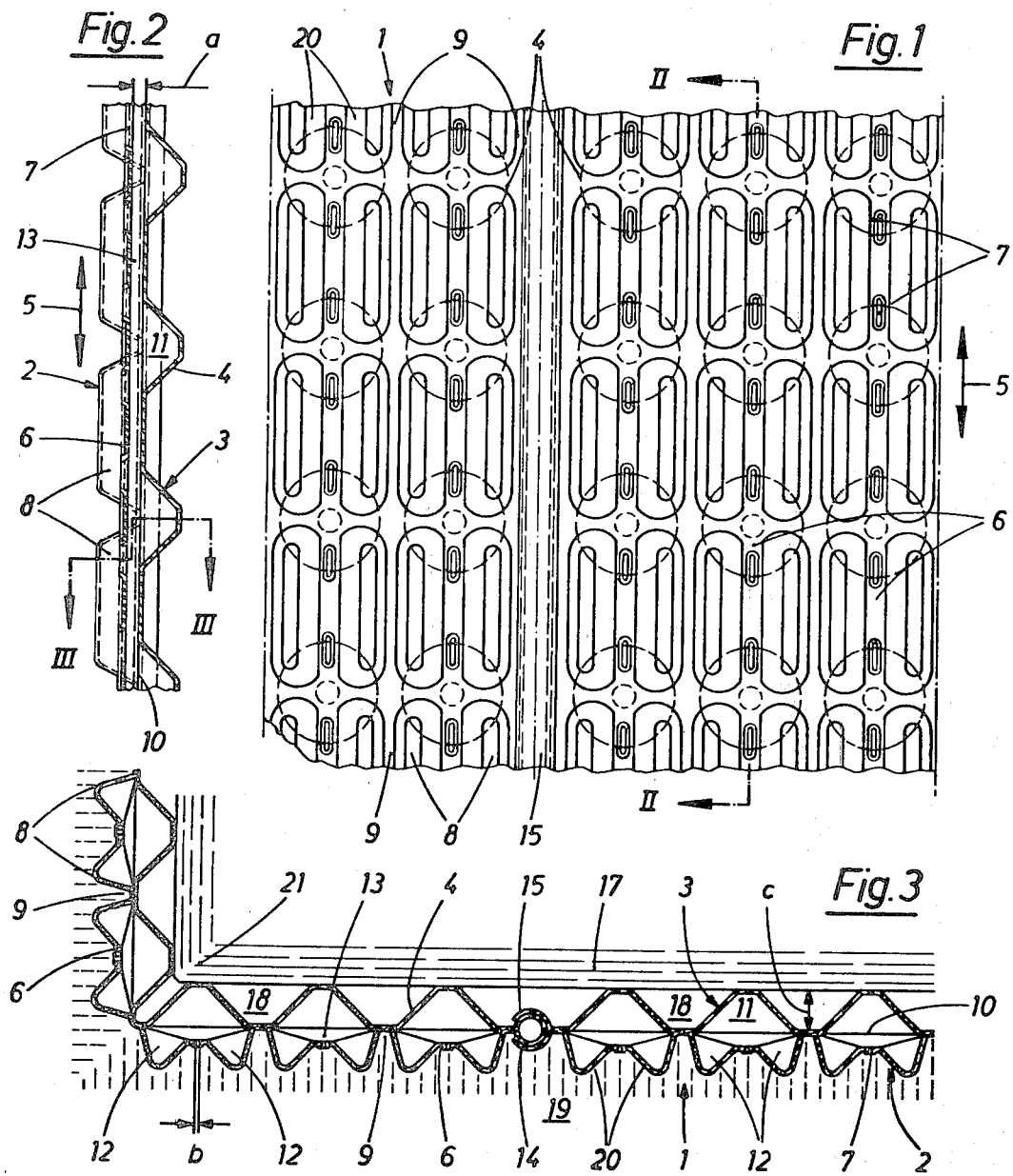

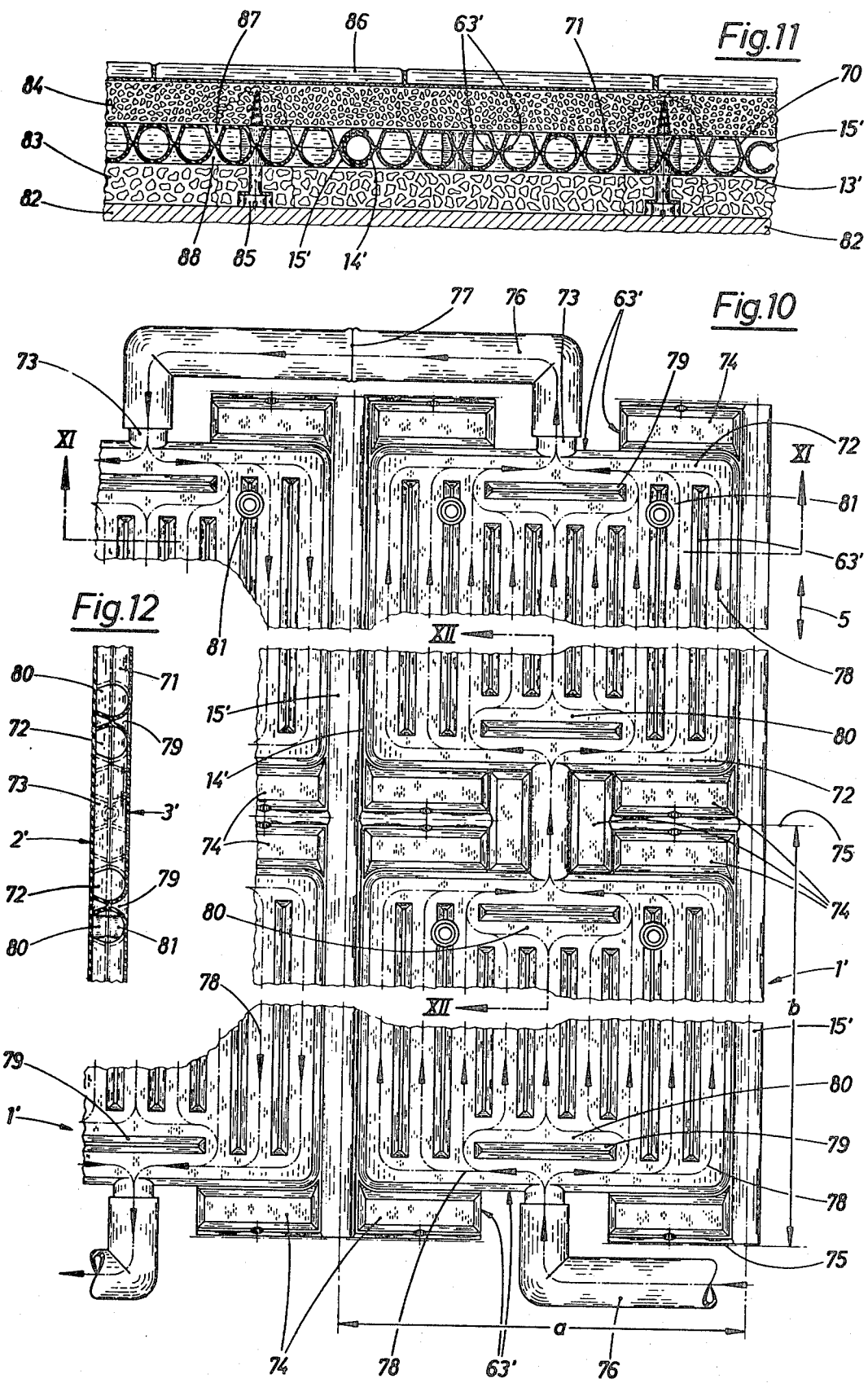

PROCESS AND APPARATUS FOR THE FABRICATION OF A FLAT-SHAPED HOLLOW BODY

FIELD OF THE INVENTION

The invention relates to a process for the fabrication of a flat-shaped hollow body for use as a ventilation, drainage or heat exchange panel or mat, and a mold apparatus for the implementation of this process.

BACKGROUND OF THE INVENTION

Flat-shaped hollow bodies of this type utilized in ventilation or drainage panels or mats or used as heat exchanger plates or panels for absorbers or for floor heating units, are known on the basis of German Offenlegungsschrift No. 25 21 374. Such flat-shaped hollow bodies are formed by welding together, or glueing together, deep drawn plates. This type of fabrication is extremely costly and only possible when practiced on a discontinuous basis.

On the basis of German Offenlegungsschrift No. 22 10 445, a process is known in which a thermoplastic insulating foil, having a large number of gas-filled cells for use as packing material or heat insulation material, can be fabricated in a continuous mode from a thermoplastic hose of extremely thin wall thickness. This can be accomplished in a device consisting of two drivable drums, which rotate in opposing directions and which have appropriate recesses in their surface areas conforming to the cells, and to which a vacuum can be applied from the inside of the drums. Such an apparatus can manufacture only very thin-walled foils having a wall thickness of 0.1–0.2 millimeters, since the hose stock cannot be cooled after the forming but while it is still in the space between the drums. Such a device is not suitable for the manufacture of flat-shaped hollow bodies having a wall thickness of even a few tenths of a millimeter.

OBJECT AND SUMMARY OF THE INVENTION

The invention is thus based on the object of creating a process and an apparatus, of this type, which could produce the desired flat-shaped hollow bodies on a continuous basis.

This object is achieved by practicing the process of this invention in the manner described below. The process, as outlined in the invention, makes it possible to fabricate a flat-shaped hollow body in a single continuous work process, without the prior fabrication of a semi-finished product from a hose. Relatively thick-walled hose stock can be used so as to achieve adequate pressure resistance on the part of the flat-shaped hollow body. This type of fabrication makes it possible to produce flat-shaped hollow bodies, which differ with respect to the details of their configuration, by practicing the same process. For example, such flat-shaped hollow bodies can be made for utilization as ventilation or drainage panels or mats for house insulation or to be used as heat exchanger panels or mats, for example, for application in solar heating facilities or heat pumps or for use in floor heating applications. What is essential is that the still warm thermoplastic hose stock be subjected to external vacuum action prior to being completely locked in the mold. This step is essential because a large number of welding points must be planned for. Compression of the hose stock, without the practice of these preliminary measures would result in the hose sticking together across its entire width were it not previously shaped through the application of vacuum action and pressed together after this preforming step.

An object of the invention is to maintain the brevity of the time sequence during which the still warm thermoplastic hose is subjected to the application of vacuum action.

Another object is to practice a particular molding process shaping the warm thermoplastic hose stock.

Yet another object is intended to assure that the still warm thermoplastic hose stock enters the shaping mold without difficulty by forming the warm thermoplastic hose into a flat workpiece prior to vacuum application.

Still another object relates to the relatively large wall thicknesses of hose stock which can be utilized in the process outlined by the invention, without resulting in problems relative to vacuum shaping.

The apparatus described in general terms shows that its characteristic features actually facilitate the application of vacuum action before the closing of the shaping mold in a simply designed manner.

Still another object is to ensure that, despite the large size of thermoplastic hose stock required for the fabrication of such flat hollow bodies, the warm thermoplastic hose will feed readily into the parts of the closing shaping mold.

BRIEF DESCRIPTION OF THE DRAWINGS

Additional advantages and features of the invention will be apparent from the following description, illustrated by the drawings in which:

FIG. 1 is a plan view of two interconnected ventilation and drainage panels or mats;

FIG. 2 is a vertical section taken along line II—II in FIG. 1;

FIG. 3 shows an application of the panel or mat, in soil in front of a cellar wall, as depicted in a section taken along line III—III in FIG. 2;

FIG. 4 shows several panels or mats of the type shown in FIGS. 1 and 2, stacked or wrapped in a configuration as indicated by section line III—III;

FIG. 10 is a plan view of a heat exchanger panel for use in floor heating or in an absorber;

FIG. 11 is a cross section taken along line XI—XI of FIG. 10; and

FIG. 12 is a partial lengthwise section taken along line XII—XII in FIG. 10.

DETAILED DESCRIPTION OF PREFERRED EMBODIMENTS

Figure 5:
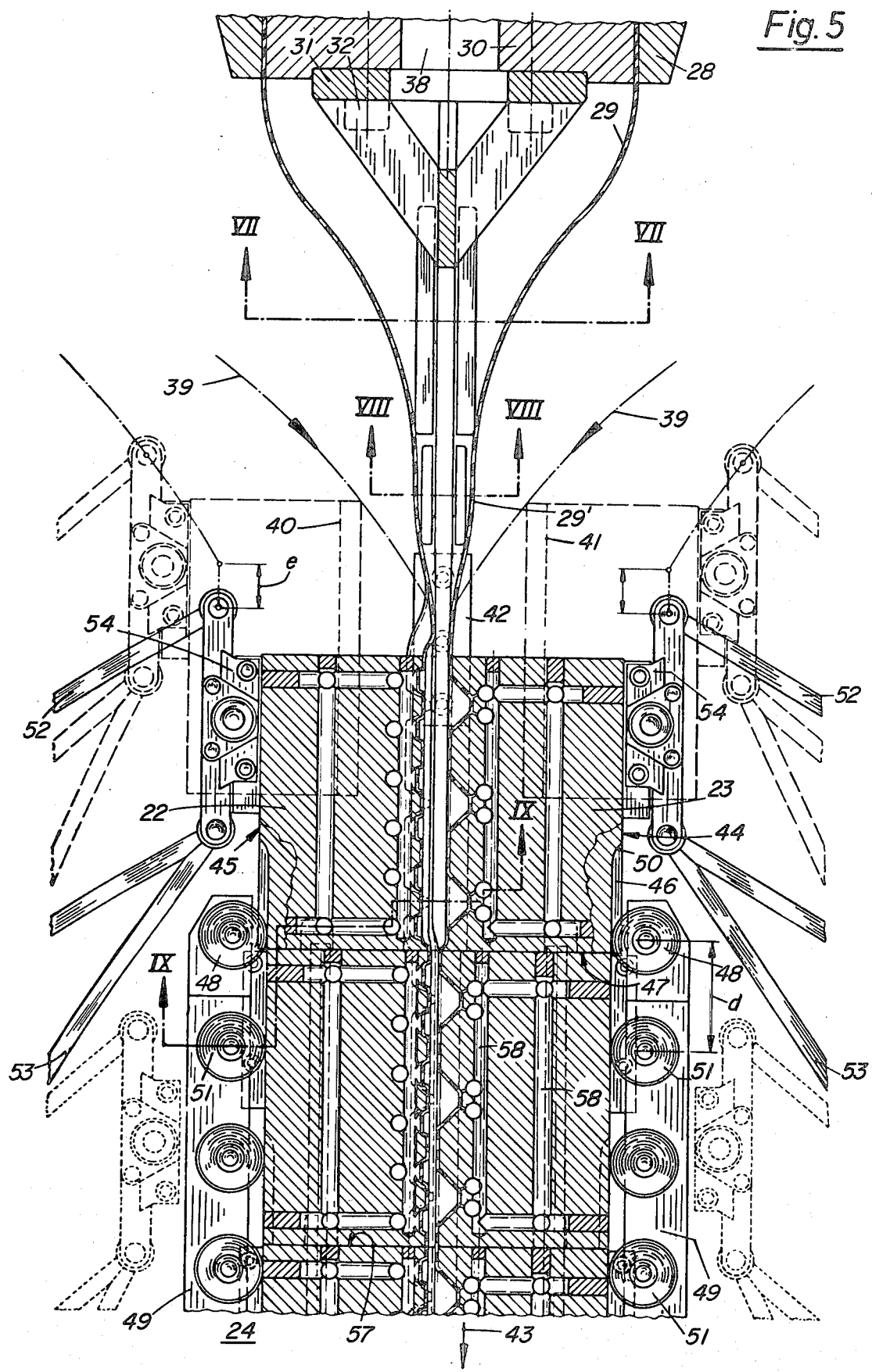
FIG. 5 is a partial detail, shown in horizontal lengthwise section, of the apparatus used for the fabrication of a flat-shaped hollow body.

The flat-shaped hollow body 1 depicted in FIGS. 1–4 as a ventilation or drainage panel or mat, has two boundary walls 2 and 3. One boundary wall 3 is equipped with truncated cone spacers 4 at set distances from each other.

The other boundary wall 2 has cleats 6 running in the lengthwise direction 5 of the mat or panel in which slots or elongated holes have been formed as water entrance ports 7. On either side of such a cleat 6 having water entrance ports 7, tunnel-shaped stiffening ribs 8 protrude from boundary wall 2 in a direction opposite to spacers 4. Crosspieces 9 remain between two adjoining stiffening ribs 8, which are located at median level 10 of hollow body 1. Thus, these crosspieces 9 run in a parallel direction to cleats 6. With the exception of truncated cone spacers 4, boundary wall 3 lies within median level 10 of the hollow body. Both boundary walls 2 and 3 thus lie flat against each other within the area of crosspieces 9, which run in lengthwise direction 5 and are welded together within this area, as is particularly evident from FIG. 3.

As is also particularly evident in FIG. 1, stiffening ribs 8 which run in lengthwise direction 5, are always interrupted in those areas in which boundary wall 3 shows truncated cone spacers 4. The panel or mat is, thus, bendable to a limited extent and can, even though its core diameter will be appropriately large, readily be rolled.

The elongated or slotted water entrance ports 7 are so arranged in cleats 6 that they at least partially overlap into hollow spaces 11 which are surrounded by spacers 4. Furthermore, channels 12 formed by stiffening ribs 8 overlap at the ends into hollow spaces 11 so that spaces having adequately large cross sections pass into each other without flow resistance as might otherwise be caused by a narrowing of any cross section element.

As can be seen from FIG. 2, cleats 6 are located at a distance of 4–10 millimeters from median level 10, namely from the level portion of boundary wall 3 so that in this area, immediately in line with water entrance ports 7, a duct 13 is formed. This height (a) (see FIG. 2) of duct 13 is always three to five times greater than width (b) (see FIG. 3) of the slots or elongated holes of water entrance ports 7.

Along one length of hollow body 1, a coupling flange 14, having a closed cylindrical profile, is formed as a single piece from both boundary walls 2 and 3. The opposing length has a matching coupling profile 15, which has a slot 16 at median level 10 along its free side. One half of this cylindrically-shaped coupling profile 15 is formed from boundary wall 2 or 3.

The coupling of two adjoining mats or tracks is accomplished by expanding coupling profile 15 of one panel or mat and pressing it over coupling flange 14 of an adjoining panel or mat as shown in FIG. 3.

In a specific application of a flat-shaped hollow body 1 as a ventilation or drainage panel or mat, the external areas of spacers 4 are placed against a cellar wall 17. In so doing, an air space 18 is created between the panel or mat and cellar wall 17, the width (c) of which essentially matches the depth of spacers 4. This air space 18 is only interrupted by spacers 4, arranged at specific intervals from each other and which, as is seen from FIG. 1, take up a maximum of one-fifth of the overall area of the mat or panel. Width (c) will generally amount to 20–40 millimeters.

The other boundary wall 2 is covered with soil 19 in this application and pressed by the soil against the cellar wall 17. It should be added that the panels or mats are placed with their longitudinal axes 5 in a vertical position in front of cellar wall 17. Any water pressing against the mat or panel from the soil 19 is guided by an integral inclined plane 20 of stiffening ribs 8 toward cleat 6 and then enters water entrance port 7 and passes into drainage duct 13 or passes immediately into hollow space 11, created by spacer 4. Thence, the water flows freely downward alternately through drainage duct 12 formed by stiffening rib 8 and hollow space 11 and spacer 4; in other words, the water flows off in a lengthwise direction 5 of the mat or panel. The open lower ends of the channels serve as water exit ports. Because only relatively narrow welds between boundary walls 2 and 3 exist in the area of connecting ribs 9, such a panel or mat, when applied to cellar wall corner 21 can readily be bent 90 degrees, as is apparent from FIG. 3.

As shown in FIG. 4, the space between two stiffening ribs 8 lying in a lengthwise direction, and particularly between their inclined surfaces 20 in this region, is so arranged that in the region where four stiffening ribs 8 on both sides of cleat 6 uniformly define a cruciform joining point, a spacer 4 is provided to permit close stacking of the mats or panels.

An appropriate flat-shaped hollow body can also be formed in such a manner as to be suitable for use as an absorber or heat exchanger for solar heating applications or for use in a heat pump. An appropriate embodiment will be described below as an example.

The partial detail, shown in FIGS. 5 through 9, of the apparatus for the manufacture of the above-described flat-shaped hollow bodies 1 corresponds in its overall configuration to the apparatus depicted and described in U.S. Pat. No. 4,212,618. Accordingly, it includes a large number of mold segment halves 22 and 23, which are joined or which augment each other to form a hollow body with forming die 24. The movement of such mold segment halves can, naturally, also be accomplished in accordance with the so-called chain circulating process, as depicted and described, for example, in U.S. Pat. No. 3,776,679.

The mold segment halves 22 and 23, which are always arranged in pairs, have a quasi square block cross section and are controlled via level machine table 25. Their adjoining sides 26 and 27, when the mold is closed, have an external form of boundary wall 2 and 3 which is formed. The continuously circulating mold segment halves 22 and 23 enter forming die 24 at its forward end. In front of this end of forming die 24 a spray nozzle 28 which is part of an undepicted plastic spray machine is mounted; this nozzle extrudes cylindrical hose stock 29. Attached to this spray nozzle 28, and specifically at its inner extruder head 30, a supporting bracket 31 is mounted with bolts 32, which carries two support and guide rollers 33 and 34, in its upper as well as its lower regions, which rotate on horizontal axes. Hose stock 29 is supported on these support and guide rollers 33 and 34. Simultaneously, the hose stock is formed into a flat hose shape 29′ by these support and guide rollers 33 and 34. These support and guide rollers 33 and 34 are desirable also because the above-described flat-shaped hollow bodies do not become useful for practical applications until they exceed widths of 25 centimeters. Owing to these large dimensions, the extrusion speed of hose stock 29 or 29′ from spray nozzle 28 is relatively low so that special guidance and support problems arise.

Figure 6:
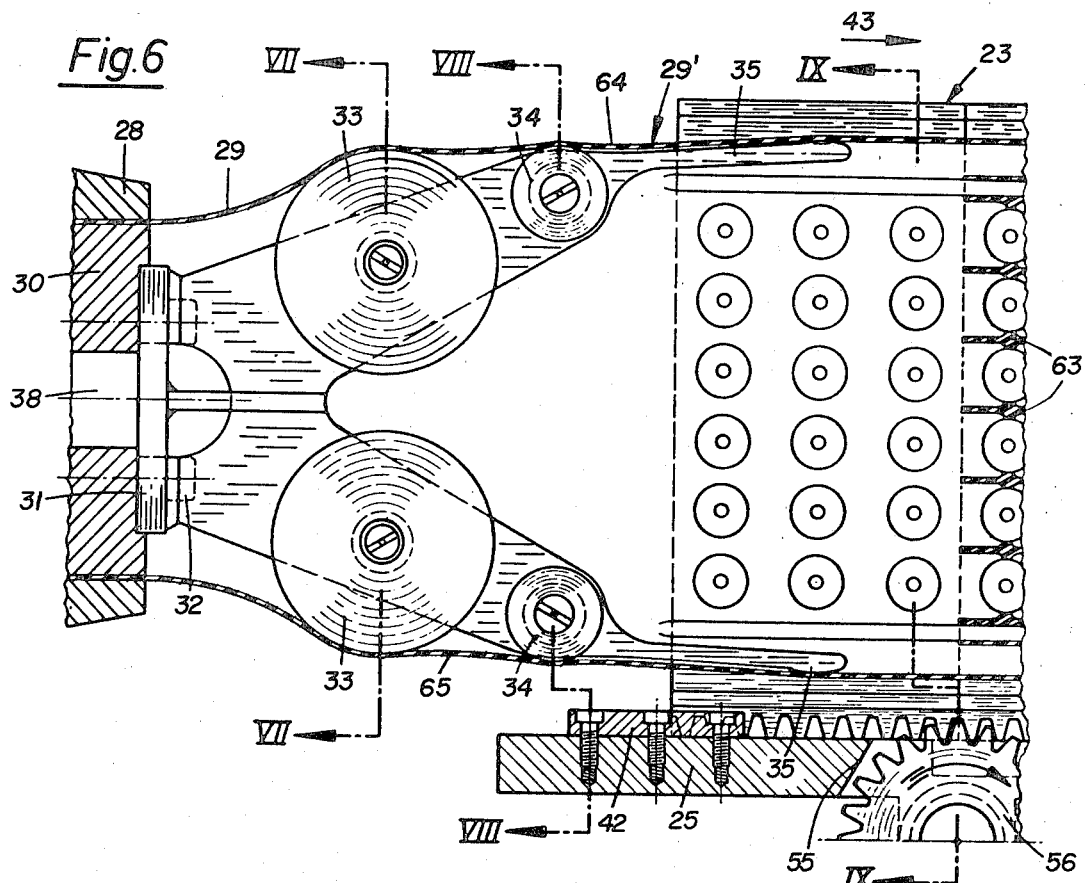
FIG. 6 is a partial detail of the apparatus shown in vertical lengthwise section.
Figure 9:
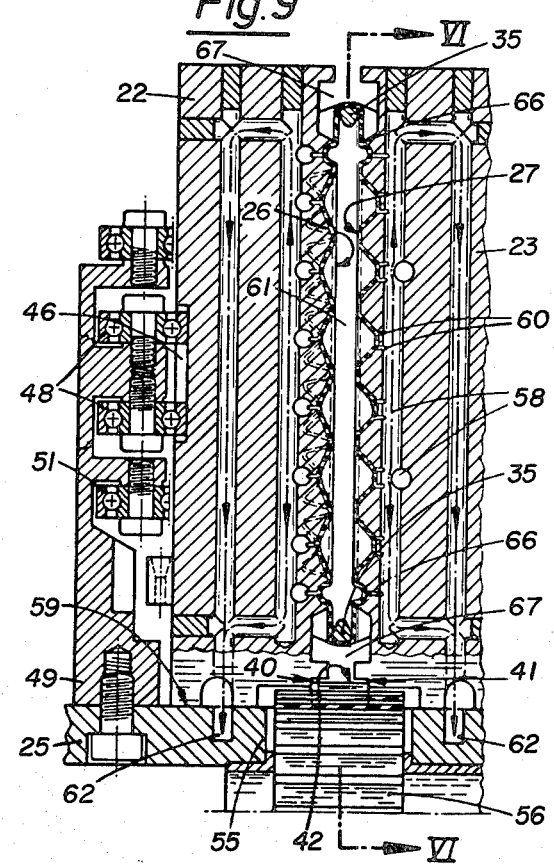

At approximately the level of expansion provided by upper and lower support and guide rollers 33 and 34, the support bracket terminates in relatively long guide tongues 35 which reach into the region in which opposing mold segment halves 22 and 23 approach each other (see FIGS. 6 and 9).

Figures 7, 8:
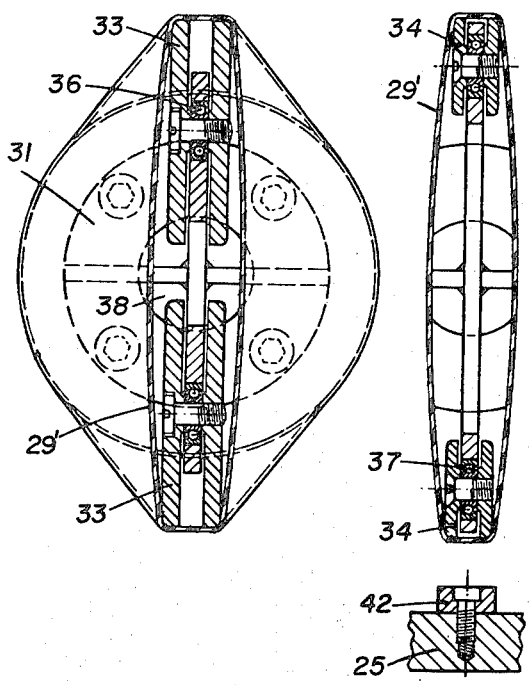
FIGS. 7 through 9 show three vertical sections taken through the apparatus, shown in FIGS. 5 and 6, in accordance with section lines VII—VII through IX—IX, respectively shown in FIG. 5.

As can be seen from FIGS. 7 and 8, support and guide rollers 33 and 34 rest lightly on roller bearings 36 and 37 so that the still warm thermoplastic hose 29 or 29' is subjected to only the minimum of deformation forces within the support region. A supportive air duct 38 is provided within extruder head 30 of spray nozzle 28, through which supporting air, having a pressure of only a few hundredth of a Bar, for example 0.01–0.05 Bars, is blown into hose 29 or 29' within the region of upper support and guide rollers 33 and 34 and which, inter alia, lightly inflates the hose stock, as can be seen in FIGS. 7 and 8.

Upon entering the forming die in accordance with the appropriate insertion curve 39, mold segment halves 22 and 23 are first brought in a mutually parallel pre-forming position, in which facing sides 26 and 27 still maintain a distance from each other which is greater than the sum of the wall thicknesses of hose stock 29 or 29', but is less than the width of the flattened drawn hose 29' (see FIGS. 8 and 9). In these pre-forming position, facing mold segment halves 22 and 23 align their striker areas 40 and 41, which have been formed along their lower edges, against striker cleat 42 which is mounted on machine table 25 and which forces mold segment halves 22 and 23 to adopt a parallel position with respect to each other and also forces their parallel movement in operation direction 43 in forming die 24.

Exterior surfaces 44 and 45 of mold segment halves 22 and 23 have been equipped with keyway 46 which extends from forward edge 47 of each mold segment half 22 in operation direction 43 over a portion of the length of the segment. The depth of keyway 46 is equal to one half of the distance between both mold segment halves 22 and 23 during this pre-forming position. Upon the entrance of each, of the mold segment halves 22 and 23 into the pre-forming position, keyway 46 is entered by a pair of feeder rolls 48, which rotate about a vertical axis in support brackets 49, mounted on machine table 25 on either side of forming die 24. At the end facing spray nozzle 28, keyway 46 uses transition ramp 50 to pass into outer face 44 or 45 of mold segment half 22 or 23, so that when this position has been reached, the pair of feeder rolls 48 presses the mold segment halves 22 and 23 against each other into their closed position. Simultaneously, a first pair of closing pulleys 51 grabs the work above and below keyway 46 along appropriate outer surfaces 44 and 45 in the region of advancing leading edge 47 so that the closing motion takes place very rapidly and uniformly and with mold segment halves 22 and 23 remaining in a parallel position with respect to each other. To ensure this operation, the axis distance (d) between feeder rolls 48 and the first pair of closing pulleys 51 is equal to the length of keyway 46. Closing pulleys 51 also rotate on vertical axes in support bracket 49 in much the same manner as other closing pulleys 51, which are mounted over the length of forming die 24 and which hold the pairs of mold segment halves 22 and 23 pressed against each other over the entire length of forming die 24.

The movement of mold segment halves 22 and 23 over, inter alia, entrance feeder curve 39 into the pre-forming position, shown in detail in FIG. 5, is accomplished with the aid of swivel arms 52, which are constructed in the form of parallel guides, and which have a work-locating jig 54 to hold the mold segment halves steady and transport them into the pre-forming position, which is mounted at the facing ends of swivel arms 52. The configuration of swivel arms 52 and the manner in which they are driven is known and, for example, depicted and described in detail in U.S. Pat. No. 4,212,618.

Following the feeder movement of the parallel guides (shown in dotted lines in FIG. 5), with mold segment halves 22 or 23 attached and following a short parallel movement along track (e), work locating jigs 54 are disengaged and swivel arms 52 and 53, together with work locating jig 54 move to the position indicated by dotted lines in FIG. 5. They then pass to the end of forming die 24 (not shown), where a pair of mold segment halves 22 and 23 which are then exiting the forming die are grasped and moved back to the front end of the forming die. When mold segment halves 22 and 23 enter the pre-forming section, they are grasped through an appropriate opening 55 in machine table 25 by protruding drive sprocket 56, which engages the toothed flange provided along their lower side and which moves each first pair of mold segment halves 22 and 23 in the operating direction 43 forming die 24. Since the forward moving leading edge 47 of mold segment halves 22 and 23 follows closely upon the rear edge 57 of these mold segment halves 22 or 23, which are moving in operating direction 43, the forward mold segment halves 22 and 23 are always driven by those mold segment halves 22 or 23 which are nearest to the spray nozzle. Among other advantages, this permits the fabrication of a completely leakproof product.

Vacuum ports 58 are provided in mold segment halves 22 or 23, which extend to the underside 59 of each mold segment half 22 or 23 which rests on machine table 25. These vacuum ports 58 are connected with mold recess 61 via openings 60 in the shape of elongated slots, in which a flat-shaped hollow body is formed.

As is particularly evident from FIG. 9, it is possible to assign one such elongated slot-shaped opening 60 in the region of mold recess 61, in which spacers 4 or stiffening ribs 8 of flat-shaped hollow bodies 1 are formed.

The machine table 25 has upward-facing vacuum ducts 62 with which the above-mentioned vacuum ports 58 come into alignment when striker faces 40 and 41 of mold segment halves 22 or 23 come into contact with striker cleat 42 upon being brought together in the pre-forming position. This position is depicted in FIG. 9. At this moment, vacuum ports 58 are subjected to vacuum action, which results in hose stock 29' forming itself against sides 26 and 27 of mold segment halves 22 and 23 in the region of mold recess 61. This, in turn, produces a change in the shape of hose 29 even though the mold is not yet completely closed. From this position, which is depicted in FIG. 9, the complete bringing together of the pairs of mold segment halves 22 and 23, as has already been described, takes place into the closed position shown at the bottom of FIG. 5. Thus, connecting ribs 9 in boundary wall 2 are welded to the appropriately assigned areas of boundary wall 3 of flat-shaped hollow body 1 in accordance with FIGS. 1 through 4. These welds 63 are depicted in FIG. 6 so as to simultaneously indicate the location at which the pairs of mold segment halves 22 and 23 are finally pressed together in their closed position.

Since guide and support rollers 33 and 34, despite the fact that they operate on roller bearings 36 and 37 and despite the fact that they are, in all cases, coated along their operating surfaces with a lubricating layer, for example, a lubricant made of tetrafluoroethylene, tend to damage flattened hose stock 29' generally along its upper side 64 and its lower side 65, because in passing over rollers 33 and 34 the hose stock is still, after all, thermoplastic in character, it is appropriate not to make this portion of flattened hose stock 29' into a wall component of flat-shaped hollow body 1. Accordingly, as seen in FIG. 9, it is cut off with cutting edges 66 mounted above and below mold recess 61 which do the cutting at the time the pairs of mold segment halves 22 and 23 are brought together. The shearing operation takes place below upper guide tongue 35 and above lower guide tongue 35.

To ensure that upper and lower guide tongues 35 do not collide with sides 26 and 27 of the pairs of mold segment halves 22 and 23 when the latter are brought into position, sides 26 and 27 are provided with appropriate cut-outs 67, top and bottom, above and below, mold recess 61.

Vacuum action is applied to vacuum ducts 62 in the normal manner by a vacuum pump (not shown).

Flat-shaped hollow bodies are fabricated from a sprayable thermoplastic and sufficiently pliable material, for example, from high-pressure polyethylene or polypropylene. The wall thickness of boundary wall 2 and 3 can be 0.5–1.5 millimeters, depending on the desired application of the product.

Water entry ports 7 are formed in the flat-shaped hollow body in accordance with FIGS. 1–4 in such a manner that appropriately large mammilated bulges are formed in cleats 6 which form boundary wall 2, and which are cut off and thus become open ended, in a subsequent fabrication operation. This method of production is known from German Pat. No. 14 59 414. Naturally, the fabrication of these water entry ports 7 can be effected in any other suitable manner, for example, by practicing the so-called planetary slotting process.

The example of flat-shaped hollow body 1 as shown in FIGS. 10 through 12, is fabricated in the previously described manner, using the previously depicted and described device, where, naturally, the shape of the mold segment halves 22 and 23 which delimit mold recess 61 is appropriately adapted. The flat-shaped hollow body 1 serves as a heat exchanger panel or mat for purposes of floor heating and has two boundary walls 2' and 3'. In its longitudinal direction 5 which corresponds to operating direction 43 during fabrication, it is equipped with grid dimension (b) and grid width (a), with (a) being more advantageously kept at $\leq 250$ millimeters and (b) at a whole multiple of, or whole part of, one meter. Into each grid unit, determined by grid length (b), ducts 13' are formed in the lower boundary wall 2' which have a semi-cylindrical cross section. In upper boundary wall 2', ducts 70 are formed having a trapezoidal-like cross section, which cover ducts 13'; along these ducts 13' and 70, the upper and lower boundary walls 2' and 3' are connected by welds 63'. Flow paths 71 provided by ducts 13' and 70 run in longitudinal direction 5 of flat-shaped hollow body 1. In the area of the end of each grid unit, there are no welds 63, so that double-sided connecting ducts 72 are provided for flow paths 71. Each connecting duct 72 terminates in a connecting stub 73 which connects the transverse-positioned connecting ducts 72 of two adjacent but separated grid units. Between the grid units, there are several blind chambers 74, of which those immediately adjoining connecting stub 73 are squeezed shut at their welds 63' in such a manner that they can be separated from the grid with thumb pressure or with a screwdriver, as shown, top and bottom, in FIG. 10. The blind chambers found along dividing line 75 of two adjacent grid units, which are also adjacent to each other, remain with the appropriate portion of flat-shaped hollow body 1 when the hollow body 1 is cut or parted along the length of such a dividing line. Connecting stub 73 and coupling cleat 14' or coupling profile 15' which are located along the long sides of the grid, must be cut with a knife or a saw. When two such flat-shaped hollow bodies 1, as shown in FIG. 10, are to be placed next to each other, they are attached to each other by coupling cleats 14' and coupling profiles 15' and, at their ends, connecting stubs 73 are interconnected by use of c-shaped connecting pipe 76 which is pressed onto connecting stub 73 and glued or welded in place electrically. Such a connecting pipe 76 can also be produced by butt-welding 77 two L-shaped pipes together.

In order to achieve a uniform speed of flow of the flow medium through all flow paths 71, in the direction indicated by flow direction arrows 78, a cross piece 79 is inserted by appropriate welding techniques in front of the mouth of connecting stub 73 within boundary walls 2' and 3', around which the flow medium must pass in addition to connecting duct 72 which traverses virtually the entire width (a) of the grid, cross piece 79 creating supplemental short cross duct 80.

Some of the flow pathways 71, which are flanked by weld locations 63', are equipped with attachment holes 81.

The placement of this flat-shaped hollow body 1 which is primarily intended to be used for heating of floors, takes place along floor line 82. A thermal insulating panel 83, for example, a panel made of hardened polyurethane foam, is placed beneath hollow body 1, whereas a good heat conducting panel 84, for example, a hard fiberboard panel, is arranged on top. The two panels and the hollow body are connected by screws 85. The connection between the two panels 83 and 84 and the interspersed hollow body 1' is accomplished with screws 85, which are inserted from the bottom insulating panel 83 through attachment holes 81 of hollow body 1 and are screwed into heat conducting panel 84. On the basis of the shape of ducts 13' and 70, large contact areas, and thus also large heat-transfer areas, exist between upper boundary wall 2 and heat-conducting panel 84, whereas there is only a small contact area, and thus a small heat transfer, between lower boundary wall 3' and thermal insulating panel 83. Above heat-conducting panel 84 a normal floor covering 86 is then installed, for example, ceramic tile or a similar material. To the extent to which floor heating devices, made of panels 83 and 84 and flat-shaped hollow bodies 1' may not be placed on floor lines 82, blind panels of equal thickness are used. Gusset-shaped voids 87 and 88 between flow paths 71 can be filled with a suitable material so as to increase thermal insulation downward and raise heat conductance upward, as well as to improve stability.

The described flat-shaped hollow body 1' can also be used as an absorber panel or mat for a heat pump, even for so-called energy packs or energy fences, provided appropriate spacers are utilized so as to facilitate the packaging of such flat-shaped hollow bodies.

It will be obvious to those skilled in the art that various changes may be made without departing from the scope of the invention and the protection granted is not limited to what is shown in the drawings and described in the specification but only to what is covered by the following claims.

What is claimed is:

1. Process for the continuous manufacture of a flat-shaped body, particularly a ventilation and drainage panel or mat or a heat exchange panel or mat, equipped with fluid transport ducts, which have fluid entry ports and fluid exit ports, through the use of a mold consisting of continuously-moving mold segment halves, moving along a forming line which, upon entering the forming die, are moved through the forming die in close contact with each other in the operating direction and with the forming die closed on pairs of mold segment halves, wherein a warm thermoplastic hose is introduced into the forming die and formed there under vacuum, wherein said hose has a relatively large wall thickness, and wherein the hose stock, in at least a portion of its cross section, is subjected to vacuum action before the two mold segment halves are brought together and is then pressed together thereby forming voids and welds over at least a portion of its cross section.

2. Process according to claim 1, wherein the application of vacuum action is initiated about 0.2–0.5 seconds prior to the closing of the mold.

3. Process according to claim 1 or 2, wherein low pressure supporting air is blown into the warm thermoplastic hose stock.

4. Process according to claim 3, wherein said supporting air is blown in at a pressure of about 0.01 to 0.05 Bars.

5. Process according to claim 3, wherein said warm thermoplastic hose is formed into a flat workpiece prior to the application of vacuum action.

6. Process according to claim 3, wherein said hose stock has a wall thickness of about 0.5–2 millimeters.

7. Apparatus for continuously forming a flat-shaped hollow body comprising a forming die consisting of movable and continuously guided mold segment halves which, upon entering the forming die, are guidable into close facing proximity to each other and move in an operating direction, wherein the two paired mold segment halves have mold recesses which correspond with the desired profile of the hollow body and wherein the mold segment halves are equipped with at least one vacuum port which leads in one direction to their underside and in another direction to the mold recess on their other side and which can be aligned with at least one vacuum port in a machine table which holds the forming die in place, and wherein at least one vacuum port is formed in such a manner as to permit at least one vacuum hole to be aligned with this vacuum port before the mold closes.

8. Apparatus according to claim 7, wherein support and guide rollers for the hose stock are disposed ahead of the forming die.

9. Apparatus according to claim 8, wherein guide tongues which reach into the forming die are provided in addition to the support and guide rollers.

* * * * *